United States Patent
Braconnier

(10) Patent No.: US 7,122,581 B1
(45) Date of Patent: Oct. 17, 2006

(54) CERIUM PHOSPHATE AND/OR LANTHANUM SOL PREPARATION METHOD AND USE FOR POLISHING

(75) Inventor: Jean-Jacques Braconnier, Lagord (FR)

(73) Assignee: Rhodia Chimie, Boulogne-Billancourt Cedex (FR)

( * ) Notice: Subject to any disclaimer, the term of this patent is extended or adjusted under 35 U.S.C. 154(b) by 0 days.

(21) Appl. No.: 10/009,733

(22) PCT Filed: Jun. 14, 2000

(86) PCT No.: PCT/FR00/01651

§ 371 (c)(1),
(2), (4) Date: May 1, 2002

(87) PCT Pub. No.: WO00/76918

PCT Pub. Date: Dec. 21, 2000

(30) Foreign Application Priority Data

Jun. 16, 1999 (FR) ................................. 99 07620

(51) Int. Cl.
- C01B 25/37 (2006.01)
- C01B 25/45 (2006.01)
- C01F 17/00 (2006.01)
- B01J 13/00 (2006.01)
- C09K 3/14 (2006.01)

(52) U.S. Cl. ................. 516/89; 524/403; 423/263; 51/307; 106/14.12; 106/286.1

(58) Field of Classification Search ............... 516/89; 106/14.12, 286.1; 524/403; 423/263; 252/584; 51/307

See application file for complete search history.

(56) References Cited

U.S. PATENT DOCUMENTS

| | | | | |
|---|---|---|---|---|
| 3,507,804 A | * | 4/1970 | Ropp | ............ 252/301.4 P |
| 3,615,807 A | * | 10/1971 | Yates | ............ 106/439 |
| 3,752,878 A | * | 8/1973 | Kehl et al. | ............ 423/263 |
| 4,942,697 A | * | 7/1990 | Khaladji et al. | ........ 423/263 X |
| 5,376,304 A | * | 12/1994 | Yamamoto et al. | ..... 423/263 X |
| 5,470,503 A | * | 11/1995 | Braconnier | ........... 252/301.4 P |
| 5,478,550 A | | 12/1995 | Suzuki et al. | ........ 424/59 |
| 5,482,544 A | * | 1/1996 | Okuda et al. | ............ 106/14.12 |
| 5,746,944 A | * | 5/1998 | Braconnier | ........... 252/301.4 P |
| 5,858,465 A | * | 1/1999 | Hunt et al. | ............ 427/248.1 |
| 5,948,683 A | * | 9/1999 | Koermer et al. | ............. 436/37 |
| 6,190,780 B1 | * | 2/2001 | Shoji et al. | .......... 106/14.12 X |
| 6,716,407 B1 | * | 4/2004 | Davis et al. | ............ 423/305 |

FOREIGN PATENT DOCUMENTS

| EP | 0 498 689 | * | 8/1992 |
| EP | 0 581 622 | * | 2/1994 |
| EP | 0 685 549 | * | 12/1995 |
| EP | 0 902 103 | * | 3/1999 |
| JP | 11-061429 | | 3/1999 |

OTHER PUBLICATIONS

Boakye et al: "Porous Aluminum Oxide and Lanthanum Phosphate Fiber Coatings", Proceedings of the 1996 20th Annual Conf. on Composites Advanced Ceramics, Materials and Structures Bl Cocoa Beach, FL., Janh 1-1996, vol. 17, No. 4, 1996, pp. 53-60; XP 00212977 Ceram. Eng. Sci Proc; Ceram. Eng. & Sci. Proceedings 1996 American Ceramic SRC.*

Peng Chen et al: "Synthesis and Characterization of Lanthanum Phosphate Sol for Fiber Coating" Journal of Materials Science, Jul. 15, 1997, Chapman & Hall, UK, vol. 32, No. 14, pp. 3863-3867, XP 002129771 ISSN: 0022-2461, p. 3863-3864.*

Chem Abstracts, vol. 129, No. 3, Jul. 20, 1998, Columbus, OH.; Abstract No. 31047, Shji Hiromasa et al: "Corrosion-Resistant Surface-Treated Metal Sheets with High Chromium Leaching Resistance" XP 002129788 & JP 10 147888A (NIffon Steel Corp.) Jun. 2, 1998.*

Chem, Abstracts, vol. 130, No. 18, May 3, 1999, Columbus, OH.; Abstract No. 240413, Shoji Hiromasa et al.:"Surface-Treated Metal Material Haumg Corrosion -Resistants Coating" XP 002129789 & JP 11 0614429A (Nippon Steel Corp.) May 5, 1999.*

JPO on EAST, Patent Abstracts of Japan, Japan patent Office, JP408294871A (Nov. 1996).*

JPO on EAST, Patent Abstracts of Japan, Japan patent Office, JP404130014A (May 1992).*

"Acids and Bases", Chapter 8, *Advance Organic Chemistry—Reactions, Mechanisms, and Structure*, Fourth Edition, pp. 248-253, (1992, month unknown).

* cited by examiner

*Primary Examiner*—Daniel S. Metzmaier

(74) *Attorney, Agent, or Firm*—Buchanan Ingersoll & Rooney, PC

(57) ABSTRACT

A cerium and/or lanthanum phosphate sol includes an aqueous phase; particles of a phosphate of at least one rare earth selected from cerium and lanthanum; and an acid other than phosphoric acid, the cerium and lanthanum salts of which are soluble in water. A process for preparing this sol includes continuously introducing a first solution of salts of at least one of the rare earths into a second solution of phosphate ions with an initial pH of less than 2; controlling the pH of the precipitation medium during precipitation at a constant value of less than 2; separating the precipitate from the reaction medium and of taking up the dispersion in water then adding to the dispersion obtained at least one said rare earth salt and said acid in a quantity such that the final $PO_4^{3-}$/rare earth mole ratio in the dispersion is 1.

10 Claims, No Drawings

CERIUM PHOSPHATE AND/OR LANTHANUM SOL PREPARATION METHOD AND USE FOR POLISHING

This application is a national stage application filed pursuant to 35 U.S.C. §371, and is based upon International Application PCT/FR00/01651 filed Jun. 14, 2000.

The invention concerns a cerium and/or lanthanum phosphate sol, a process for its preparation and it use in polishing.

The development of the electronics industry requires an ever-increasing-use of compositions for polishing the various parts such as disks or dielectric components. Such compositions are in the form of suspensions and they have to satisfy a number of characteristics. As an example, they must have a high matter removal rate which stems from their abrasive nature. They must also have the lowest possible defectivity, with "defectivity" meaning the number of scratches on the substrate treated by the composition. A certain selectivity of the composition towards a metal may also be required. Thus the development of such compositions is a complex problem.

Thus there exists a need for such polishing compositions.

The aim of the invention is to provide such compositions and a process for preparing such compositions.

To this end, the sol of the invention is characterized in that it comprises:
an aqueous phase;
particles of a phosphate of at least one rare earth selected from cerium and lanthanum;
an acid other than phosphoric acid the cerium and lanthanum salts of which are soluble in water.

Further, the invention also concerns a process for preparing a sol of a phosphate of at least one rare earth selected from cerium and lanthanum which, in a first implementation, is characterized in that it comprises the following steps: mixing a solution of salts of at least one said rare earth with phosphate ions in a $PO_4^{3-}$/rare earth mole ratio of more than 1 with control of the pH of the reaction medium to a value of more than 2; ageing the precipitate obtained if the value of the pH of the reaction medium is in the range 2 to 6; separating the precipitate from the reaction medium; redispersing said precipitate in water; adding at least one salt of said rare earth to the dispersion and said acid in a quantity such that the final $PO_4^{3-}$/rare earth mole ratio in the dispersion is 1.

In a second implementation of the invention, a process for preparing a sol of a phosphate of at least one rare earth selected from cerium and lanthanum is characterized in that it comprises the following steps: continuously introducing, with stirring, a first solution of salts of at least one said rare earth into a second solution containing phosphate ions and with an initial pH of less than 2; the phosphate ions being present in a quantity such that the $PO_4^{3-}$/rare earth mole ratio is more than 1; controlling the pH of the reaction medium to a substantially constant value of less than 2; separating the precipitate from the reaction medium; redispersing said precipitate in water; adding at least one salt of said rare earth and said acid to the dispersion in a quantity such that the final $PO_4^{3-}$/rare earth mole ratio in the dispersion is 1.

Further characteristics, details and advantages of the invention will become more apparent from the following description and non-limiting examples given by way of illustration.

The invention concerns a sol of a rare earth phosphate, the rare earth being cerium or lanthanum, more precisely an orthophosphate with formula $LaPO_4$, La designating the rare earth. This orthophosphate is hydrated and has a hexagonal structure. The invention is, of course, applicable to mixed cerium and lanthanum phosphates $(La,Ce)PO_4$ and the term "rare earth phosphate" will be used in a general manner in the remainder of the description with the meaning which has just been defined in this paragraph.

Throughout the remainder of the description, the expression "sol" or "colloidal dispersion" of a rare earth phosphate designates any system constituted by fine solid particles of colloidal dimensions based on this phosphate in suspension in a liquid phase, said phosphate also possibly containing residual quantities of bonded or adsorbed ions such as nitrates, acetates, citrates or ammonium. It should be noted that in such dispersions, the phosphate can be either completely in the form of colloids, or simultaneously in the form of ions and in the form of colloids.

The average diameter of the rare earth phosphate particles is generally at most 200 nm. These particles are constituted by an agglomeration of elementary crystals, generally acicular in form, about 5 nm to 20 nm thick and a few tens of nanometers long, in particular in the range about 25 nm to about 200 nm. The average diameter of the particles or colloids is determined by Sedigraph granulometric analysis and the shapes and dimensions of the elementary crystals are determined by electron microscopy.

In one feature of the invention, the sol also contains an acid. This acid is an acid other than phosphoric acid. It is an acid selected from those the lanthanum and cerium salts of which are soluble in water. This acid can in particular be an organic acid. More particularly, this acid can be selected from those wherein the $pK_a$ is at least 3. Examples which can be cited are nitric acid, acetic acid, formic acid, citric acid and propionic acid. The acid can be present in any form, dissociated or undissociated.

Preferably, the pH of the sol of the invention is at least 4. This pH can in particular be in the range 4 to 6, more particularly between 4.5 and 5.5. The pH of the sol can be fixed at different values depending on the $pK_a$ of the acid used.

The concentration of the sol can vary between wide limits, for example in the range of 0.01 to 2 moles of $LaPO_4$ per liter.

The process for preparing the sol of the invention will now be described. Two implementations can be employed for the process.

The first implementation corresponds to a process of the type mentioned in European patent application EP-A-0 498 689 the description of which should be referred to.

As indicated above, this first implementation comprises a first step in which a solution of salts of at least one said rare earth is mixed with phosphate ions in a $PO_4^{3-}$/rare earth mole ratio of more than 1, controlling the pH of the reaction medium to a value of more than 2.

In particular, suitable rare earth salts are salts which are soluble in aqueous media, such as nitrates, chlorides, acetates, carboxylates or a mixture thereof.

The phosphate ions which are intended to be reacted with the solution of rare earth salts can be supplied by compounds which are pure or in solution, such as phosphoric acid, alkali phosphates or phosphates of other metallic elements producing a soluble compound with the anions associated with the rare earths. The phosphate ions are preferably added in the form of a solution of an ammonium phosphate which can more particularly be di-ammonium or mono-ammonium phosphate.

The phosphate ions are present in a quantity such that the reaction medium has a $PO_4^{3-}$/rare earth mole ratio of more than 1, advantageously in the range 1.1 to 3.

The term "controlled pH" means the pH of the precipitation medium is held at a certain value, which is constant or substantially constant, by adding basic compounds or buffer solutions to the medium. The pH of the medium will thus vary by at most 0.5 pH units about the set value, preferably by at most 0.1 pH unit about this value.

The mixture of the solution of the rare earth salt and the phosphate ions produces a precipitate. The precipitate is aged in the precipitation medium, after mixing is complete, for a period which can, for example, be in the range about 15 min to about 10 hours, when precipitation takes place at a pH in the range about 2 to 6. This ageing can produce a product which can be filtered. This ageing step is not necessary when the pH of the precipitation medium is more than 6. However, it can be carried out to further improve the filterability of the precipitate. Ageing can be carried out at any temperature, for example in the range 15° C. to 100° C.

The pH is advantageously controlled by adding a basic compound. Examples of suitable basic compounds which can be cited are metallic hydroxides (NaOH, KOH, $Ca(OH)_2$, . . . ) or ammonium hydroxide, or any other basic compound the constituent species of which do not form any precipitate when added to the reaction medium, by combination with one of the other species contained in the medium, to control the pH of the precipitation medium. A preferred basic compound is ammonia, advantageously used in an aqueous solution.

Precipitation is preferably carried out in an aqueous medium at a temperature which is not critical and which is advantageously in the range from ambient temperature (15° C.–25° C.) to 100° C. The reaction medium is stirred while precipitation takes place.

The precipitate obtained can be separated from the reaction medium by any suitable means, in particular by filtering. It can, for example, be washed with water to eliminate any impurities.

The precipitate is then dispersed in water. Finally, at least one said rare earth salt and said acid other than phosphoric acid are added in a quantity such that the final $PO_4^{3-}$/rare earth mole ratio in the dispersion is equal to 1. This addition is made with stirring and, optionally, hot. Ageing can be carried out for a period in the range 15 minutes to 1 hour.

At the end of this last step, a dispersion or sol of the rare earth phosphate of the invention is obtained. This sol is stable.

The preparation process can also be carried out in accordance with a second implementation which is the preferred implementation. This second implementation corresponds to the process described in European patent application EP-A-0 581 622 the description of which can be referred to.

The first step of this process consists of introducing, continuously and with stirring, a first solution of salts of at least one of said rare earth salts into a second solution containing phosphate ions and with an initial pH of less than 2; during precipitation, the pH of the precipitation medium is controlled at a substantially constant value of less than 2.

The above description with respect to the first implementation regarding the precipitation parameters, in particular as regards the rare earth salts, the phosphate ions ($PO_4^{3-}$/rare earth mole ratio of more than 1) and controlling the pH is also applicable here.

However, a certain order of introducing the reactants must be followed; more precisely, the solution of soluble salts of the rare earth or rare earths must be introduced slowly and continuously into the solution containing the phosphate ions. Further, the solution containing the phosphate ions must initially (i.e., before starting to introduce the solution of rare earth salts) have a pH of less than 2, preferably in the range 1 to 2. Further, while the solution used naturally does not have such a pH, the latter is brought to the suitable desired value either by adding a base (for example ammonia, in the case of an initial solution of phosphoric acid) or by adding an acid (for example nitric acid in the case of an initial solution of di-ammonium phosphate).

Next, during introduction of the solution containing the rare earth salt or salts, the pH of the precipitation medium gradually reduces; further, to maintain the pH of the precipitation medium to the desired constant working value, it must be less than 2 and preferably in the range 1 to 2, a basic compound is simultaneously introduced into this medium.

At the end of the reaction, a precipitate is recovered which is treated in the same manner as that described in the case of the first implementation to obtain the sol of the invention.

The invention also concerns a suspension for polishing, comprising a sol as described above or a sol as obtained by the processes described above. This suspension can be used to polish glass, for example in the areas of glass making, glazing, plate-glass, television screens, spectacles, or for polishing ceramic materials or other vitreous type materials. More particularly, this suspension can also be used for CMP type polishing in the electronics industry. In this case, it is particularly suitable for polishing metallic substrates used in producing microprocessors, these substrates being produced from copper, aluminium, titanium nitride or tungsten.

In general, in addition to the compound with an abrasive property such as the sol of the invention, such suspensions comprise additives such as a dispersing agent or an oxidising agent.

The sol of the invention can also be used on a substrate as an anti-corrosion agent, for example on metallic substrates and in particular on steel substrates.

The condition of the substrate before the treatment does not require any particular intervention, apart from conventional degreasing and cleaning treatments. The substrates may or may not be pre-oxidised.

Deposition on the substrate can be carried out directly from the sol using conventional coating techniques of the dipping or spraying type, for example.

The substrate must then be heat treated, in particular to eliminate water.

The heat treatment is generally carried out at a temperature of at most 600° C. This temperature can be lower, for example at most 400° C., depending on the nature of the substrates.

Finally, the sol of the invention can be used as an anti-UV agent, for example in plastic materials.

Non limiting examples will now be given.

EXAMPLE 1

This example concerns the preparation of a cerium phosphate sol of the invention.

Firstly, a 2 mol/l phosphoric acid solution was heated to 60° C. and pre-neutralised to a pH of 1.5 by 6 mol/l ammonia. A 2 mol/l cerium nitrate solution was added continuously over 1 hour. The quantity of solution was determined so as to have a $PO_4^{3-}$/rare earth mole ratio of 1.1. The pH of the reaction medium was adjusted to 1.5 by adding ammonia in a concentration of 6 mol/l. The final concentration of precipitated cerium phosphate was 0.75 mol/l.

The reaction mixture was aged for 30 minutes at 60° C. It was filtered than washed with cold water. It was dried in a Buchner flask for 15 minutes.

The moist phosphate obtained had an excess of $PO_4^{3-}$ ions of $0.6\times10^{-3}$ mole/g. 4.5 kg of this phosphate was dispersed in 30 l of deionised water then after stirring, 974 g of cerium acetate was added so that the $PO_4^{3-}$/Ce ratio was brought to 1.

The mixture was allowed to age for 30 minutes at ambient temperature.

The final concentration of the sol was 100 g/l of cerium phosphate; the pH was 4.8.

TEM microscopic analysis showed that the phosphate was in the form of particles constituted by acicular crystals up to 170 nm long and with a width in the range 5 to 20 nm.

EXAMPLE 2

The procedure of Example 1 was followed until a moist cerium phosphate was obtained with an excess of $PO_4^{3-}$ ions of $0.5\times10^{-3}$ mole/g of cerium phosphate with respect to the exact stoichiometry.

189 g of this cerium phosphate was dispersed in 1 liter of deionised water with stirring and at 20° C.

55 g of cerium nitrate in solution was added to this dispersion at 20° C. and with stirring, so that the $PO_4^{3-}$/rare earth ratio was brought to 1.

The mixture was aged for 30 minutes at 20° C.

The final concentration of this sol was 110 g/l of cerium phosphate and its pH was 1.4.

EXAMPLE 3

This example concerns the preparation of a lanthanum phosphate sol of the invention.

Precipitation of the lanthanum phosphate was identical to that of the cerium phosphate of the preceding examples. The moist lanthanum phosphate obtained had an excess of $PO_4^{3-}$ ions of $6.6\times10^{-4}$ mole/g of moist lanthanum phosphate with respect to the exact stoichiometry.

170 g of moist lanthanum phosphate was dispersed in 1.1 liters of deionised water with stirring and at 20° C.

24 g of lanthanum acetate $La(CH_3COO)_3 \cdot 1.3H_2O$ was added to this dispersion at 20° C. and with stirring, so that the $PO_4^{3-}$/rare earth ratio was brought to 1.

The mixture was aged for 30 minutes at 20° C.

The final concentration of this sol was 100 g/l of lanthanum phosphate and its pH was 4.5.

EXAMPLE 4

The starting material was a moist lanthanum phosphate obtained as in Example 3 but with an excess of $PO_4^{3-}$ ions of $3.9\times10^{-3}$ mole/g of moist lanthanum phosphate with respect to the exact stoichiometry.

113.6 g of lanthanum phosphate was dispersed in 0.74 liter of deionised water with stirring and at 20° C.

26.8 g of lanthanum nitrate in solution was added to this dispersion at 20° C. and with stirring, so that the $PO_4^{3-}$/rare earth ratio was brought to 1.

The mixture was aged for 20 minutes at 20° C.

The final concentration of this sol was 100 g/l of lanthanum phosphate and its pH was 1.36.

EXAMPLE 5

This example concerns the use of the sol of Example 1 for polishing.

Substrates (wafers) coated with tungsten, titanium nitride, copper or aluminium were polished.

The operating conditions were as follows:

LOGITECH PM5 CMP machine, with 4-point planarization analysis;

Pressure 2 psi ($1.1\times10^4$ Pa);

Concentration of sol: 1% by weight; sol flow rate; 100 ml/min;

Table rotation rate: 33 rpm.

The results are shown in the following table:

| Substrate | Al | $TiN_2$ | Cu | W |
|---|---|---|---|---|
| Removal rate in Å/min | 5200 | 66 | 1410 | 21 |

What is claimed is:

1. A process for preparing a sol, the sol comprising:
    an aqueous phase; particles of a phosphate of one rare earth consisting of cerium; an acid other than phosphoric acid, a cerium salt of which is soluble in water, wherein the particles of phosphate are orthophosphates, and wherein said acid is selected from the group consisting of acetic acid, formic acid, citric acid and propionic acid, the process comprising:
        mixing a solution of salts of cerium with phosphate ions in a $PO_4^{3-}$/cerium mole ratio of more than 1 with control of the pH of the reaction medium to a value of more than 2;
        then ageing the precipitate obtained if the value of the pH of the reaction medium is in the range 2 to 6;
        separating the precipitate from the reaction medium;
        re-dispersing said precipitate in water;
            adding cerium and said acid to the dispersion in a quantity such that the final $PO_4^{3-}$/cerium mole ratio in the dispersion is equal to 1.

2. A process according to claim 1, wherein the pH of the precipitation medium is controlled by adding a basic compound.

3. A process according to claim 2, wherein said basic compound is ammonium hydroxide.

4. A process according to claim 1, wherein said phosphate ions are in the form of an ammonium phosphate solution.

5. A process for preparing a sol, the sol comprising:
    an aqueous phase; particles of a phosphate of one rare earth consisting of cerium; an acid other than phosphoric acid, a cerium salt of which is soluble in water, wherein the particles of phosphate are orthophosphates, and wherein said acid is selected from the group consisting of acetic acid, formic acid, citric acid and propionic acid, the process comprising:
        continuously introducing, with stirring, a first solution of salts of cerium into a solution containing phosphate ions and with an initial pH of less than 2; the phosphate ions being present in a quantity such that the $PO_4^{3-}$/cerium mole ratio is more than 1;
        controlling the pH of the reaction medium to a substantially constant value of less than 2 during precipitation;
        separating the precipitate from the reaction medium;
        re-dispersing said precipitate in water;

adding cerium and said acid to the dispersion obtained in a quantity such that the final $PO_4^{3-}$/cerium mole ratio in the dispersion is 1.

6. A process for preparing a sol, the sol comprising:

an aqueous phase; particles of a phosphate of one rare earth consisting of lanthanum; an acid with a $pK_a$ of at least 3, other than phosphoric acid, a lanthanum salt of which is soluble in water, wherein the particles of phosphate are orthophosphates, and wherein said acid is selected from the group consisting of acetic acid, formic acid, citric acid and propionic acid, the process comprising:

mixing a solution of salts of lanthanum with phosphate ions in a $PO_4^{3-}$/lanthanum mole ratio of more than 1 with control of the pH of the reaction medium to a value of more than 2;

then ageing the precipitate obtained if the value of the pH of the reaction medium is in the range 2 to 6;

separating the precipitate from the reaction medium;

re-dispersing said precipitate in water;

adding lanthanum and said acid to the dispersion in a quantity such that the final $PO_4^{3-}$/lanthanum mole ratio in the dispersion is equal to 1.

7. A process according to claim 6, wherein the pH of the precipitation medium is controlled by adding a basic compound.

8. A process according to claim 7, wherein said basic compound is ammonium hydroxide.

9. A process according to claim 6, wherein said phosphate ions are in the form of an ammonium phosphate solution.

10. A process for preparing a sol, the sol comprising:

an aqueous phase; particles of a phosphate of one rare earth consisting of lanthanum: an acid with a $pK_a$ of at least 3, other than phosphoric acid, a lanthanum salt of which is soluble in water, wherein the particles of phosphate are orthophosphates, and wherein said acid is selected from the group consisting of acetic acid, formic acid, citric acid and propionic acid, the process comprising:

continuously introducing, with stirring, a first solution of salts of lanthanum into a solution containing phosphate ions and with an initial pH of less than 2; the phosphate ions being present in a quantity such that the $PO_4^{3-}$/lanthanum mole ratio is more than 1;

controlling the pH of the reaction medium to a substantially constant value of less than 2 during precipitation;

separating the precipitate from the reaction medium;

re-dispersing said precipitate in water;

adding lanthanum and said acid to the dispersion obtained in a quantity such that the final $PO_4^{3-}$/lanthanum mole ratio in the dispersion is 1.

* * * * *